United States Patent [19]

Tarbuck

[11] Patent Number: 4,599,036
[45] Date of Patent: Jul. 8, 1986

[54] POSITIVE REGISTRATION COMPLIANT APPARATUS FOR ROBOTIC ASSEMBLERS

[75] Inventor: Robert R. Tarbuck, Ardmore, Pa.

[73] Assignee: Sperry Corporation, New York, N.Y.

[21] Appl. No.: 611,232

[22] Filed: May 17, 1984

[51] Int. Cl.$^4$ .............................................. G01B 5/25
[52] U.S. Cl. ...................................... 414/730; 901/16; 901/45; 33/185 R
[58] Field of Search ............... 901/16, 45; 414/730; 33/185 R, 169 C, 172 D, 189

[56] References Cited

U.S. PATENT DOCUMENTS

| 4,266,905 | 5/1981 | Birk et al. | 901/45 X |
| 4,316,329 | 2/1982 | Watson | 33/169 C |
| 4,400,885 | 8/1983 | Consales | 33/185 R |
| 4,439,926 | 4/1984 | Whitney et al. | 901/45 X |

FOREIGN PATENT DOCUMENTS 2449078 4/1976 Fed. Rep. of Germany ... 901/45 X

Primary Examiner—Terrance L. Siemens
Attorney, Agent, or Firm—James R. Bell; Thomas J. Scott; Marshall M. Truex

[57] ABSTRACT

The problem of re-establishment of initial precision registration of end-effectors used in automatic robotic assembly following failed insertion attempts is avoided due to a positive registration compliant apparatus having a support member including a bearing mount spaced apart from a shaped seat. A holder for holding and mounting electronic components is movably mounted on the support member and extends through the bearing mount. The holder has a portion correspondingly shaped for mating engagement with the shaped seat. The holder is resiliently urged into engagement with the seat. A rotation limiter is provided for limiting rotation of the holder relative to the support.

9 Claims, 3 Drawing Figures

POSITIVE REGISTRATION COMPLIANT APPARATUS FOR ROBOTIC ASSEMBLERS

BACKGROUND OF THE INVENTION

1. Field of the Invention

This invention related generally to work holders for electrical circuit assemblages and more particularly to automated insertion of the pins of various multiple lead electronic devices into corresponding pin holes in a printed circuit board.

2. Background Description

Robots are used for the assembly of electronic equipment such as for mounting multiple lead IC chips and other electronic components on circuit boards. Examples of such devices include ceramic chip carriers, relays, transformers, IC components, resistor network components and other components having pins or fragile leads which may, for example, be on 0.050 inch centers. The components typically include from 24–54 such pins which are about 10.5 mils in diameter which are to be inserted in holes which are about 14–18 mils in diameter.

Present known robots use servo-systems and are programmed to position a robotic arm specific distances in the X-Y axes, i.e. in a plane parallel to the board to accomplish alignment, and, once reaching the proper X-Y coordinates, to then move in the Z axis, i.e. vertically toward and away from the board to accomplish insertion of the leads into holes in the board. The board is semi-flexible and the periphery of the board is supported. As a result, the board has some compliance in the Z axis. Also, the flexibility of the leads provides additional compliance in the Z direction. Further, Bernoulli type and vacuum type holders, or remote center compliant devices attached to the robotic arm, provide compliance while holding the device for insertion. The total X-Y-Z compliance provides beneficial deflection in the assembly system which aids in limiting damage to the devices and the board during insertion attempts. Some of these holders, referred to as end effectors, are also compliant in rotation expressed in terms of $\theta$.

Limitations of robotic assembly include bent or deformed pins which preclude insertion, mis-positioning of the robotic arm in the X-Y axes, and pin vs. hole tolerance which may be inconsistent.

Some known remote center compliant devices include resilient members of elastomeric material which deform to avoid jamming during insertion of parts. Sensory feedback causes the robotic arm to withdraw and try again if an insertion attempt is unsuccessful. Rapid repetition of these attempts is required to make the automation fast and therefore economically justifiable. However, a hysteresis effect is present which delays reestablishment of the end effector to a null position or initial precision registration point relative to the X, Y, Z, $\theta$ compliance. This hysteresis effect is caused by deformation of the elastomeric material which relatively slowly restores to the null position. This is because restoring forces in the material grow weaker as the device approaches re-establishment of the initial registration. Thus, when subsequent attempts are being made, initial precision registration of the end effector may not have been fully restored which further complicates the problem of automated pin to hole insertion.

The foregoing illustrates limitations known to exist in devices similar to the present invention. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a positive registration compliant apparatus for robotic assemblers including a support member having a bearing mount spaced apart from a shaped seat. Means are provided for holding an electronic component and mounting the component on a printed circuit board. The holding means is movably mounted on the support member and extends through the bearing mount. A portion of the holding means is correspondingly shaped for mating engagement with the shaped seat. Resilient means engage the holding means and the support member for urging the shaped portion toward the shaped seat. Rotation limiting means, associated with the support member and the holding means, limit rotation of the holding means.

The foregoing and other aspects will become apparent from the following detailed description of the invention when considered in conjunction with the accompanying drawing. It is to be expressly understood, however, that the drawing is not intended as a definition of the invention but is for the purpose of illustration only.

DESCRIPTION OF THE PREFERRED EMBODIMENT

Figure 1:
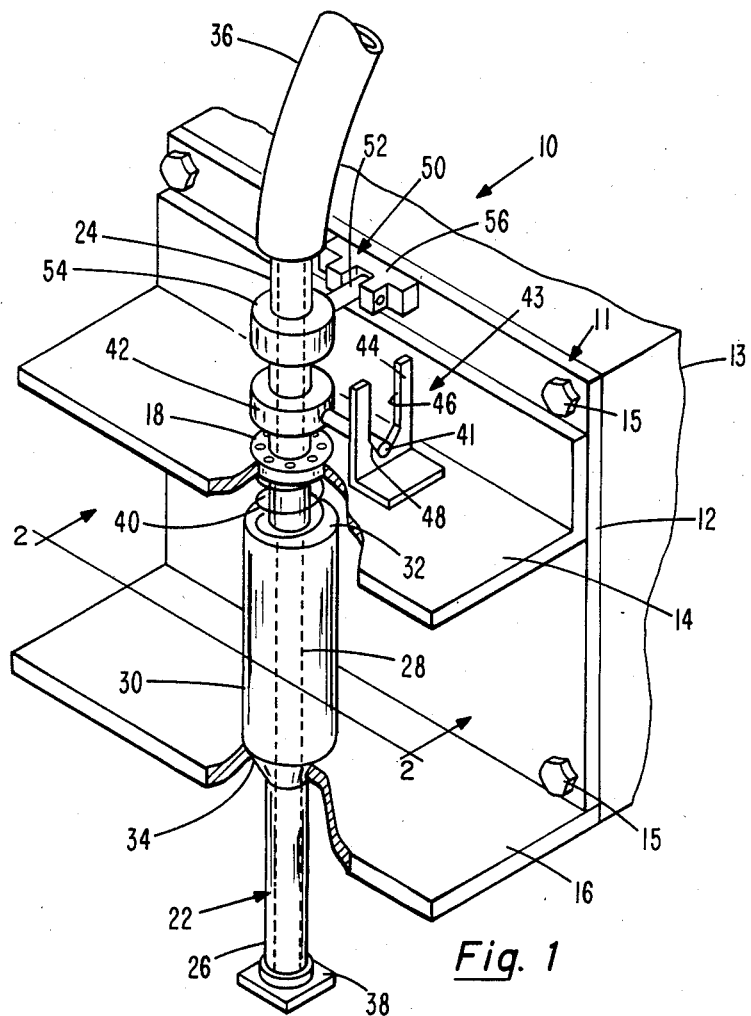
FIG. 1 is a perspective view illustrating an embodiment of the apparatus of this invention.
Figure 2:
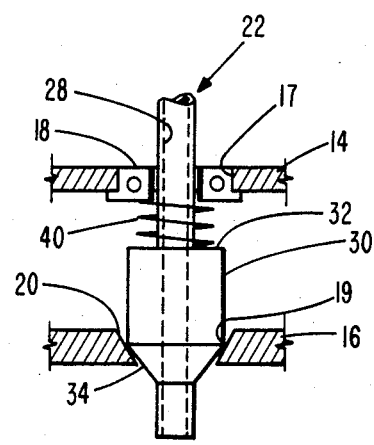
FIG. 2 is a partial frontal view taken along the line 2—2 of FIG. 1.

A positive registration complaint apparatus for robotic assemblers is generally designated 10, FIGS. 1 and 2, and includes a support member 11 formed of aluminum or other suitable material having a main support plate 12, a first plate 14 and a second plate 16 connected to main plate 12. Plates 14 and 16 are spaced apart and extend from main plate 12 in substantially parallel planes. A bearing mount 18, which comprises a commerically available ball bearing or a sleeve bearing of a suitable size, is mounted in aperture 17 formed through plate 14. An aperture 19 is formed through plate 16 and includes tapered sidewalls 20 forming a tapered seat see also FIG. 2. Apertures 17, 19 are vertically aligned as viewed in FIGS. 1 and 2. Main plate 12 is connected to a well-known robotic assember arm 13, by bolts 15. Although sidewalls 20 are tapered, other shapes such as rounded, may be used if desired.

Means such as an elongated tubular holder member 22 formed of a suitable material, has a first end 24 and a second end 26 interconnected by a passageway 28 formed therethrough. Member 22 extends through bearing mount 18 in a slip-fit relationship adjacent first end 24. Member 22 includes a first enlarged diameter portion 30 having a substantially flat land 32 and a tapered portion 34 of a construction sufficient for mating engagement with the tapered seat formed by sidewalls 20. Of course, if sidewalls 20 are rounded, portion 34 would be correspondingly rounded to mate therewith.

First end 24 is of construction sufficient for receiving a known vacuum conduit 36 to be connected thereto. Second end 26 is of a construction sufficient to receive an available vacuum holder 38 used for holding electronic components for mounting on a printed circuit board. In this manner, member 22 is provided for holding and mounting electronic components. Member 22 extends through apertures 17, 19 and due to the slip-fit relationship between member 22 and bearing mount 18, and further due to the inherent play in bearing mount 18, member 22 is movable in the Z axis and $\theta$ (rotation). Movement of arm 13 provides for movement of member 22 in the X and Y axes and also in the Z axis.

Resilient means such as a suitable steel spring 40 is compressed between land 32 and plate 14 adjacent bearing mount 18, FIG. 2. Spring 40 engages member 22 and plate 14 and thus urges tapered portion 34 of member 22 into seating engagement with the mating tapered seat formed by sidewalls 20. In this manner, member 22 is movably mounted on support 12.

Means 43 for limiting rotation of member 22, are associated with support member 11. A second enlarged diameter portion 42 of member 22 includes a probe 41, adjacent bearing mount 18, and extending therefrom substantially parallel to plate 14. A receiver guide 44 is connected to first plate 14 and includes a slot 46 having converging tapered portions 48. Probe 41 is provided to move in slot 46 and to fully seat with tapered portions 48 simultaneously with tapered portion 34 seating against tapered sidewalls 20.

A commercially available electrical or optical proximity type motion detector means 50 is associated with support 11 and member 22. A member 52 of motion detector 50 extends from a third enlarged diameter portion 54 of member 22 and moves with member 22 relative to a member 56 of detector 50 connected to main plate 12. In this manner movement of holder 22 is monitored by known technology controlling the movement associated with robotic arm 13.

Figure 3:
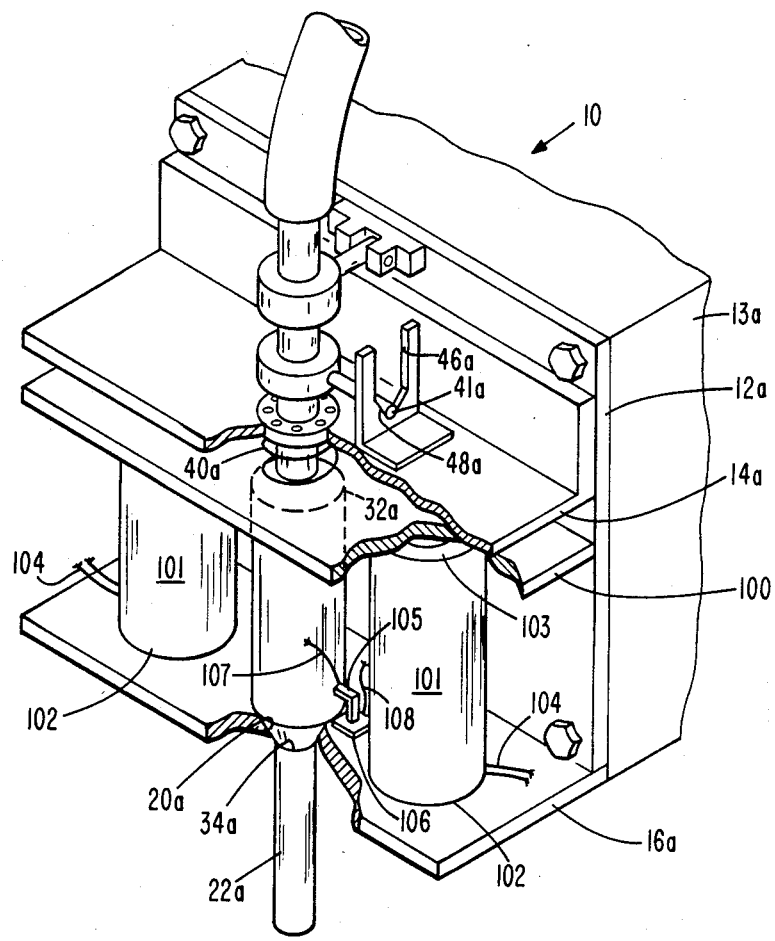
FIG. 3 is a view illustrating an alternative embodiment of the apparatus of this invention.

In an alternative embodiment illustrated in FIG. 3, apparatus 10 includes robotic arm 13a modified in such a manner as to provide the ability to hold initial precision registration during a pin shearing operation. Thus, apparatus 10a can pick up a component and move to a pin shear station where pins of the component are sheared to a predetermined length. From the pin shear station, apparatus 10a can be moved to insert the component, or the previously described robotic arm 13 and apparatus 10 can pick up the sheared component for the insertion step.

Apparatus 10a includes a third plate 100 formed of a suitable magnetizable material, extending in a plane which is substantially parallel to plates 14a, 16a. However, plate 100 is free to move relative to main plate 12a. Plate 100 is retained on holder member 22a between land 32a and spring 40a. A pair of suitable electromagnetic coils 101 have a first end 102 mounted on plate 16a and terminate at a second end 103 adjacent to plate 100. Coils 101 have leads 104 for electrical connection to a suitable power source (not shown). A contact 105 is connected to enlarged diameter portion 30a of holder member 20a. A contact pad 106 is mounted on plate 16a. Leads 107, 108 are connected to contact 105 and pad 106, respectively, for suitable electrical connection to provide a closed circuit when contact 105 engages pad 106. Contact 105 and pad 106 are provided to engage simultaneously with the seating of tapered portion 34a and sidewalls 20a and with the seating of probe 41a and tapered portion 48a of slot 46a.

In operation, movement of arm 13 in the known manner in the X, Y, and Z axes, places apparatus 10 substantially in the proximate location wherein an electronic component (not shown), being held by member 22 due to a vaccum drawn through vacuum holder 38 via passageway 28, is positioned for mounting on a printed circuit board (not shown). In the event that pins of the component are misaligned with associated holes in the board and insertion of the pins in the holes does not occur when arm 13 moves along the Z axis, member 22 is moved relative to member 11 from the initial registration or null position. As soon as arm 13 retracts, spring 40 immediately urges tapered portion 34 into engagement with tapered sidewalls 20 and, simultaneously, probe 41 seats in tapered portions 48 of slot 46. In this manner initial precision registration is immediately restored and rapid repeat attempts at pin insertion can be accomplished.

In the embodiment of FIG. 3, energizing the coils 101 induces an electromagnetic field of sufficient strength to urge plate 100 toward coils 101 for retaining portion 34a seated with sidwalls 20a and probe 41a seated in slot 46a. Preferably, coils 101 do not contact plate 100 to avoid possible seizure caused by residual magnetism. Contact 105 engages pad 106 and closes a circuit to signal an associated control that holder member 22a is properly seated and shearing can take place. Breaking of that circuit signals the associated control that shearing should not occur.

The foregoing has described a positive registration compliant apparatus for robotic assemblers which permits inexpensive controlled compliance in the X, Y, Z and $\theta$ directions. The apparatus positively restores to the precompliance registration or "null" position if an assembly attempt fails. This is due to the tapered seat feature combined with the rotation limiting feature.

Having thus described the invention, what is claimed is:

1. A positive registration compliant apparatus for robotic assemblers comprising:
   a support member having a bearing mount spaced apart from a shaped seat formed therein;
   means for holding an electronic component and mounting said component on a printed circuit board, said holding means movably mounted on said support member and extending through said bearing mount, said holding means further having a portion correspondingly shaped for mating engagement with said shaped seat;
   resilient means engaging said holding means and said support member for urging said shaped portion toward said shaped seat; and
   rotation limiting means associated with said support member and said holding means for limiting rotation of said holding means, said rotation limiting means including a probe connected to said movably mounted holding means, said probe extending into a tapered slot, formed in said rotation limiting means, said slot having a seat for engagement with said probe simultaneously with seated engagement of said holding means in said support member.

2. The apparatus of claim 1 wherein said support member includes a main plate having first and second plates connected thereto.

3. The apparatus of claim 2 wherein said first and second plates are spaced apart and extend in substantially parallel planes.

4. The apparatus of claim 3 wherein said bearing mount is in said first plate and said shaped seat is in said second plate.

5. The apparatus of claim 4 wherein said holding means includes a land for receiving said resilient means.

6. The apparatus of claim 5 wherein said resilient means is compressed between said land and said first plate.

7. The apparatus of claim 1 wherein said holding means is elongated and includes a passage therethrough between first and second ends thereof, said first end of said holding means including means for receiving a vacuum conduit, said second end of said holding means including means for receiving a vacuum holder.

8. The apparatus of claim 1 wherein said support member includes means for connecting to a robotic arm.

9. The apparatus of claim 8 including:
   motion detector means associated with said holding means and said support for detecting movement therebetween.

* * * * *